(12) United States Patent
Oliveira et al.

(10) Patent No.: US 7,574,747 B2
(45) Date of Patent: Aug. 11, 2009

(54) PROXIMITY DETECTION EMPLOYED IN CONNECTION WITH RIGHTS MANAGEMENT SYSTEM OR THE LIKE

(75) Inventors: Eduardo P. Oliveira, Redmond, WA (US); James M. Alkove, Woodinville, WA (US); Richard D. Prologo, Redmond, WA (US); Troy D. Batterberry, Kirkland, WA (US); Anand D. Paka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/139,951

(22) Filed: May 27, 2005

(65) Prior Publication Data

US 2005/0262022 A1    Nov. 24, 2005

Related U.S. Application Data

(63) Continuation-in-part of application No. 10/827,167, filed on Apr. 19, 2004.

(51) Int. Cl.
*H04L 9/32* (2006.01)

(52) U.S. Cl. .............................. 726/29; 726/2; 726/26; 726/27; 713/168; 713/193

(58) Field of Classification Search .................. 726/26, 726/27, 29, 2, 4, 17, 21; 713/168, 193
See application file for complete search history.

(56) References Cited

U.S. PATENT DOCUMENTS

| 5,715,403 | A | 2/1998 | Stefik | 395/244 |
| 6,133,912 | A * | 10/2000 | Montero | 715/716 |
| 2002/0152393 | A1* | 10/2002 | Thoma et al. | 713/189 |
| 2002/0157002 | A1* | 10/2002 | Messerges et al. | 713/155 |
| 2002/0198846 | A1* | 12/2002 | Lao | 705/54 |
| 2003/0065918 | A1* | 4/2003 | Willey | 713/168 |
| 2004/0098583 | A1* | 5/2004 | Weber | 713/168 |

FOREIGN PATENT DOCUMENTS

| WO | WO 00/58811 | 10/2000 |
| WO | WO 00/59150 | 10/2000 |
| WO | WO 01/52021 A1 | 7/2001 |

OTHER PUBLICATIONS

Hong, S. et al., "On the Construction of a Powerful Distributed Authentication Server without Additional Key Management", *Computer Communications*, 2000, 23, 1638-1644.

(Continued)

*Primary Examiner*—Kimyen Vu
*Assistant Examiner*—Edward Zee
(74) *Attorney, Agent, or Firm*—Woodcock Washburn LLP

(57) ABSTRACT

A sink sends a registration request to a source and the source validates same, and the source sends a registration response including a secret to the sink. The source then sends a proximity message including a nonce to the sink and concurrently notes a start time. The sink employs the secret and the nonce to generate a proximity value and sends same to the sources. The source receives the proximity value and concurrently notes an end time, verifies the proximity value based on the secret and the nonce, calculates from the noted start and end times an elapsed time, compares the elapsed time to a predetermined threshold value, decides from the comparison whether the sink satisfies the proximity requirement, and registers the sink as being able to access content from such source if the sink satisfies the proximity requirement.

12 Claims, 6 Drawing Sheets

OTHER PUBLICATIONS

Managing Digital Rights in Online Publishing, "How Two Publishing Houses Maintain Control of Copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography Regulations for E-commerce and Digital Rights Management", *Computer & Security*, 2001, 20(8), 724-738.

Zwollo, K. "Digital Document Delivery and Digital Rights Management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11); 27.

Gunter, C.A., et al. "Models and Languages for Digital Rights", *Proceedings of the 34$^{th}$ Annual Hawaii International Conference on System Sciences*, 2001, 1-5.

Peinado, M. "Digital Rights Management in a Multimedia Environment", *SMPTE Journal*, 2002, 111(3), 159-163.

Royan, B. Content Creation and Rights Management; Experiences of SCRAN(the Scottish Cultural Resources Access Network), *Program*, 2000, 34(2), 131-142.

Valimaki, M. et al., "Digital Rights Management on Open and Semi-Open Networks", *WIAPP*, 2001, 154-155.

Yu, H. "Digital Multimedia at Home and Content Rights Management", *IEEE, Proceedings 2002 IEEE 4$^{th}$ International Workshop on Networked Appliances*, 2002, 49-56.

Hwang, C. et al., "Protection of Digital Contents on Distributed Multimedia Environment", *Proceedings of the LASTED International Conference, Internet and Multimedia Systems and Applications*, Nov. 19-23, 2000, Las Vegas, Nevada, USA, pp. 127-132.

Comino, N. et al., "A Novel Data Distribution Technique for Host-Client Type Parallel Applications", *IEEE Transactions on Parallel and Distributed Systems*, 2002, 13(2), 97-110.

\* cited by examiner

PROXIMITY DETECTION EMPLOYED IN CONNECTION WITH RIGHTS MANAGEMENT SYSTEM OR THE LIKE

CROSS-REFERENCE TO RELATED APPLICATIONS

The present application is a continuation-in-part of U.S. patent application Ser. No. 10/827,167, filed Apr. 19, 2004, entitled "Rendering Protected Digital Content Within A Network Of Computing Devices Or The Like", and hereby incorporated by reference in its entirety.

The present application discloses subject matter also disclosed in:
- U.S. patent application Ser. No. 11/112,325, filed Apr. 22, 2005, entitled "Rights Management System for Streamed Multimedia Content",
- U.S. patent application Ser. No. 11/113,215, filed Apr. 22, 2005 entitled "Rights Management System for Streamed Multimedia Content",
- U.S. patent application Ser. No. 11/113,216, filed Apr. 22, 2005, entitled "Rights Management System for Streamed Multimedia Content", and
- U.S. patent application Ser. No. 11/113,160, filed Apr. 22, 2005, entitled "Rights Management System for Streamed Multimedia Content",
- all of which were filed on Apr. 22, 2005, and all of which are hereby incorporated by reference in their entirety.

TECHNICAL FIELD

The present invention relates to a rights management (RM) system whereby access to digital content is provided only in accordance with a corresponding digital license. More particularly, the invention relates to such an RM system that ensures that content licensed to a first computing device is not sub-licensed to a second computing device unless the second computing device is deemed to be proximate the first computing device.

BACKGROUND OF THE INVENTION

Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio and video of a multimedia presentation. Typical modes of distribution of such content include tangible and intangible forms such as an optical disk, a cable-access feed, a feed from an electronic network such as the Internet, a feed from an over-the-air broadcast, etc. Upon being received by a user at an appropriate computing device thereof, such user renders the digital content with the aid of the computing device, appropriate rendering software, and appropriate output devices such as speakers, a video monitor, etc.

In one scenario, the content is distributed as a stream by a distributor as part of a subscription service, such as for example a digital television service, and the streamed content as distributed is either protected, such as for example by being encrypted, or is unprotected. If it is the case that the streamed content is indeed distributed in an unprotected form, it may be the case that the distributor primarily intends for the streamed content to be immediately consumed and rendered, and not stored in any meaningful retrievable form. For example, the streamed content may be one of many streams of content in a digital cable television signal that is to be received by a digital cable set-top box and immediately rendered thereby, and is then to be forwarded to the aforementioned appropriate output devices.

However, it is to be appreciated that storage systems exist and/or are being developed that can indeed store the streamed content for later rendering and/or re-distribution to other computing devices. With regard to such storage systems, then, the distributor of the streamed unprotected content would rather not have such unprotected content stored in the unprotected form and without any ability to restrict such re-distribution, if so desired. In particular, the distributor or the like may wish to prohibit the user from copying such streamed content to another storage system or the like, may wish to allow the user to copy with temporal and/or count restrictions, or the like. As may be appreciated, by prohibiting unlimited copying of the streamed content, the distributor can avoid the unchecked dispersal of pristine digital copies of the streamed content, where such unchecked dispersal would encourage other users from foregoing from subscribing to the subscription service offered by such distributor.

In addition, the distributor may wish to provide various users with different rendering rights. For example, the distributor may offer different tiers of service, where higher-level tiers correspondingly command higher subscription fees, and where a user subscribing at a particular tier should not be allowed to access streamed content from higher tiers in an unprotected form.

Note, though, that after the streamed content has been distributed, the distributor has very little if any real control over the streamed content. This is especially problematic in view of the fact that most any personal computer includes the software and hardware necessary to make an exact digital copy of such streamed content, and to download such exact digital copy to a re-distribution medium such as an optical disk, or to send such exact digital copy over a network such as the Internet to any destination.

Of course, as part of a transaction wherein the streamed content is subscribed to, the distributor may require the user/recipient of the streamed content to promise not to re-distribute such content in an unwelcome manner. However, such a promise is easily made and easily broken. The distributor may attempt to prevent such re-distribution through any of several known security devices, usually involving encryption and decryption. However, such security devices if especially simple pose little problem to a mildly determined user who wishes to decrypt encrypted content, save such content in an un-encrypted form, and then re-distribute same.

RM and enforcement architectures and methods have thus been provided to allow the controlled rendering of arbitrary forms of digital content including streamed content, where such control is flexible and definable by the distributor or the like of such digital content. Such architectures allow and facilitate such controlled rendering in the scenario as set forth above.

In one particular arrangement, the streamed content is one of a plurality of streams of such content provided as a combined signal to a receiver. The receiver selects a particular one of the streams upon command from a media system, and provides the selected stream to such media system for further processing. Notably, the selected stream as provided to the receiver is unprotected, but prior to being provided to the media system the selected stream is in fact protected by the receiver according to a particular RM encryption system.

Typically, in an RM encryption system, the content is protected by being encrypted according to a content key (CK). Inasmuch as symmetric encryption and decryption is easier, faster, and less expensive than asymmetric encryption and decryption, such content key (CK) is typically symmetric. Also typically, the content key (CK) is provided by an encryptor such as the receiver to a decryptor such as the media system in an encrypted form and as part of a digital license or the like that specifies license rules that must be satisfied before such content is allowed to be decrypted and rendered by the decryptor/media system.

It is to be recognized that a computing device having streamed content stored therein may be networked with one or more other computing devices, and that a user having saved content on a first computing device of the network may wish to render the content by way of a second computing device in the network. More particularly, it is to be appreciated that the first computing device should ensure that the second computing device is within the network, or at least is proximate to the first computing device. Accordingly, the user cannot render the content in connection with another network, or at least by way of a computing device remote from the first computing device.

A need exists then, for a system and method for a first computing device to ensure that a second computing device is proximate to the first computing device prior to allowing the second computing device to render content licensed to the first computing device. In particular, a need exists for a method by which the first computing device can at least roughly determine how close the second computing device is to the first computing device based on an amount of time to respond to a sent message.

SUMMARY OF THE INVENTION

The aforementioned needs are satisfied at least in part by the present invention in which a method is provided for a computing device acting as a sink for rights-managed content to register with a computing device acting as a source for the content, where the source registers the sink only if the sink satisfies a proximity requirement. In the method, the sink sends a registration request to the source and the source validates same, and the source sends a registration response to the sink, where the registration response includes a random value as a secret.

The source then sends a proximity message to the sink and concurrently notes a start time, where the proximity message includes a random value as a nonce. The sink upon receiving the proximity message employs the secret and the nonce to generate a proximity value and sends a proximity response with the proximity value to the sources. The source receives the proximity response with the proximity value from the sink and concurrently notes an end time, and also verifies the proximity value based on the secret and the nonce, calculates from the noted start and end times an elapsed time, compares the elapsed time to a predetermined threshold value, decides from the comparison whether the sink satisfies the proximity requirement, and registers the sink as being able to access content from such source if the sink satisfies the proximity requirement.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
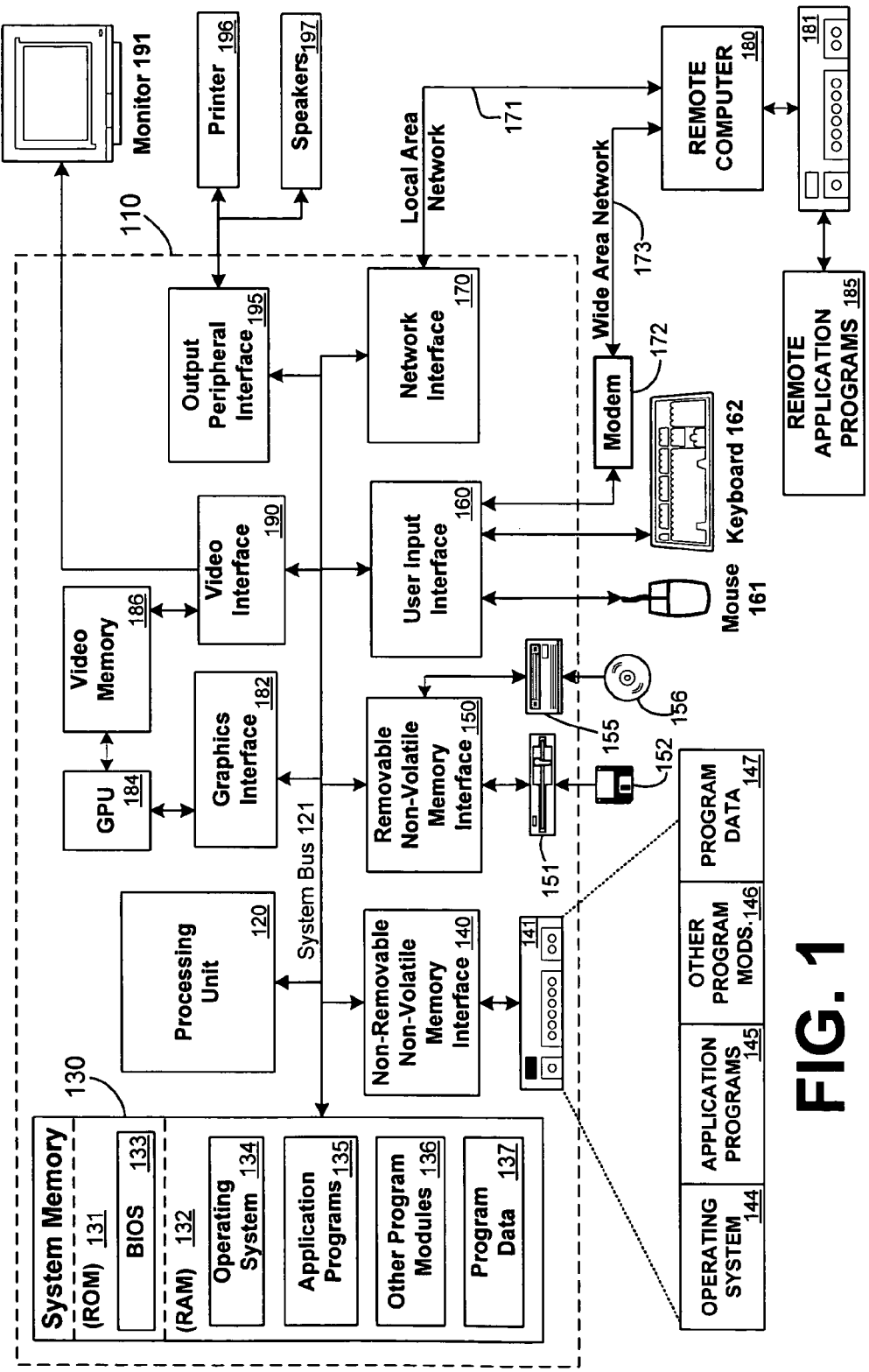
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
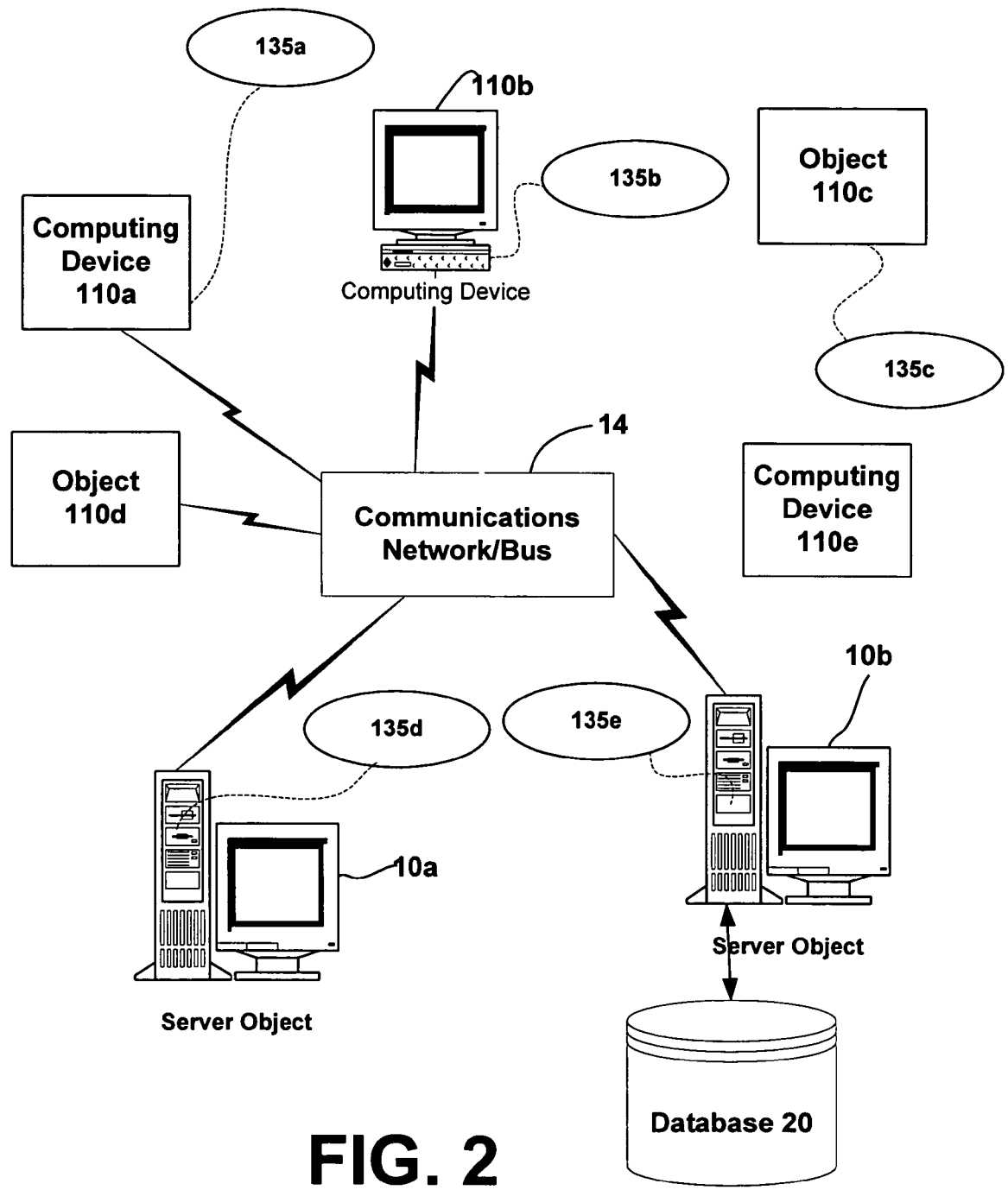
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
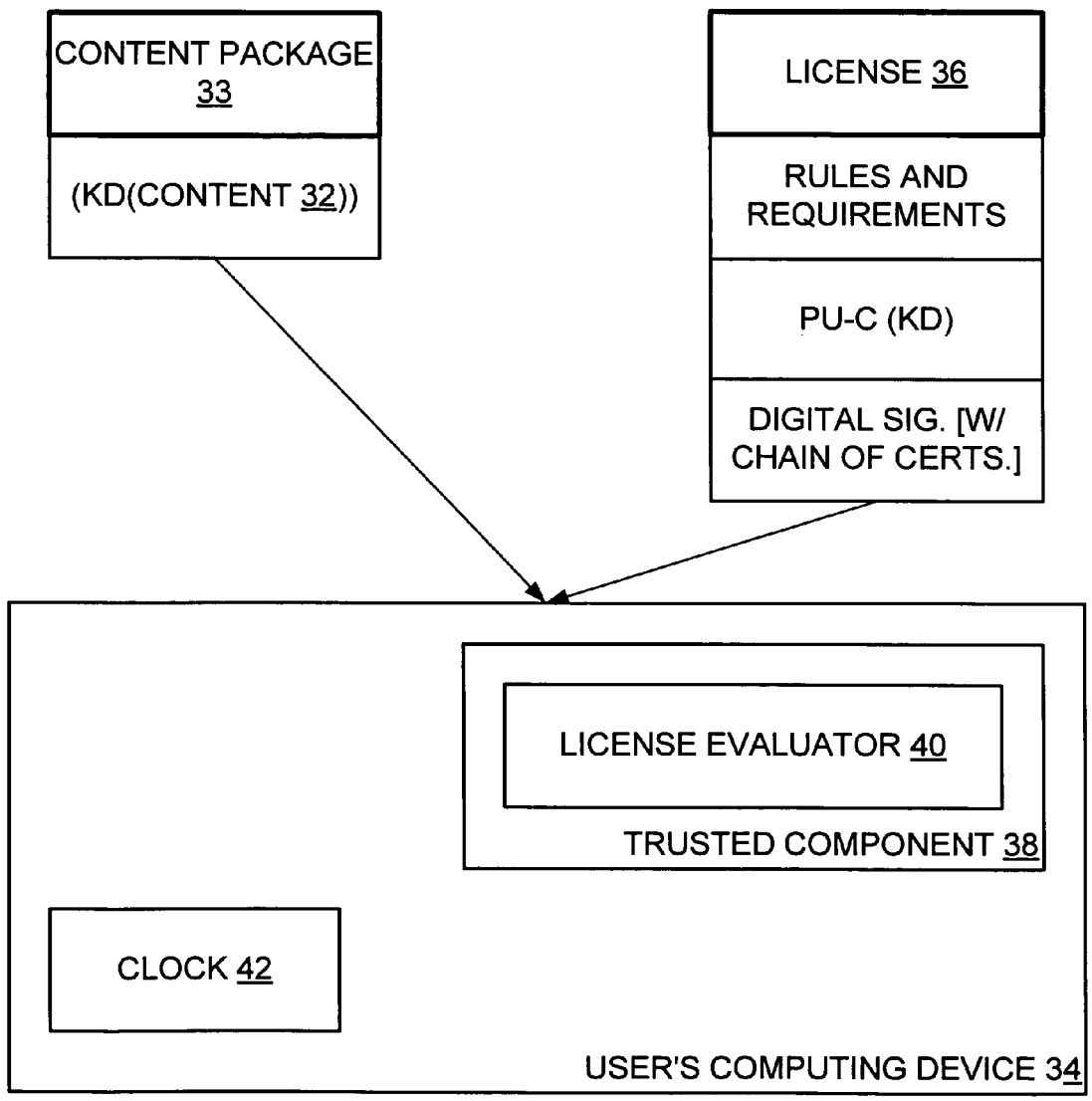
FIG. 3 is a block diagram showing an enforcement architecture of an example of a trust-based system, including a digital license for rendering corresponding digital content in accordance with various embodiments of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed or redistributed to a user. Upon being received by the user, such user renders the digital content 32 with the aid of an appropriate rendering device such as a media player, text displayer, etc. on a personal computer 34 or the like.

Typically, a content owner or developer or distributor (hereinafter 'distributor') distributing such digital content 32 wishes to restrict what the user can do with such distributed digital content 32, or at least ensure that the content 32 is not redistributed in an unwanted manner. For example, the content distributor may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, and as was set forth above, after distribution has occurred, such distributor has very little if any control over the digital content 32. An RM system 30, then, allows the controlled rendering of arbitrary forms of digital content 32, where such control is flexible and definable by the content distributor of such digital content. Typically, to protect the content 32, such content 32 is encrypted with a symmetric encryption/decryption key (KD), (i.e., (KD(CONTENT))), and is packaged with other information relevant to the content 32 in a package 33.

The trust-based RM system 30 allows a distributor of digital content 32 to specify at least some license rules that must be satisfied before such digital content 32 is allowed to be rendered by a computing device 34 of a user. Such license rules can include the aforementioned temporal requirement, and may be embodied within a digital license or use document (hereinafter 'license') 36 that the user/user's computing device 34 (hereinafter, such terms are interchangeable unless circumstances require otherwise) must be possess. Such license 36 also includes the decryption key (KD) for decrypting the digital content 32, perhaps encrypted according to a key decryptable by the user's computing device 34. As seen in FIG. 3, such encrypting key is a public key of the user's computing device 34 (PU-C), and the user's computing device 34 presumably has the corresponding private key (PR-C) by which (PU-C(KD)) may be decrypted.

The content distributor for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 might specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34. If such clock 42 is provided, such clock 42 may be a secure clock 42 that cannot be tampered with by a user in an effort to overcome a temporal restriction of a license 36.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered. As set forth above, the license 36 with (PU-C(KD)) in effect authorizes an entity in possession of (PR-C) to access (KD) and thereby access the content 32 encrypted according to such (KD), presuming of course that the entity abides by all conditions as set forth in the license 36.

Note that a license 36 typically includes a digital signature for authentication/validation purposes. Likewise, other forms of digital constructs such as a piece of digital content 32 may also have such a digital signature for authentication/validation purposes. As should be known, such a digital signature may be constructed based on a first key from a pair of asymmetric keys or from a symmetric integrity key, for example by performing some sort of hash on the underlying data to which the signature is attached and then encrypting the hash with the key. Thereafter, the signature is validated by applying the second key from the pair of asymmetric keys or the integrity key, again for example by decrypting the encrypted hash and comparing the decrypted hash to another hash of the underlying data to which the signature is attached. If the hashes match, it can be presumed that the underlying data has not been altered and the underlying construct therefore can be authenticated. Typically, an RM system 30 will not honor a license 36 or the like that is not authenticated.

System for Receiving and Handling Streamed Multimedia Content 32

Figure 4:
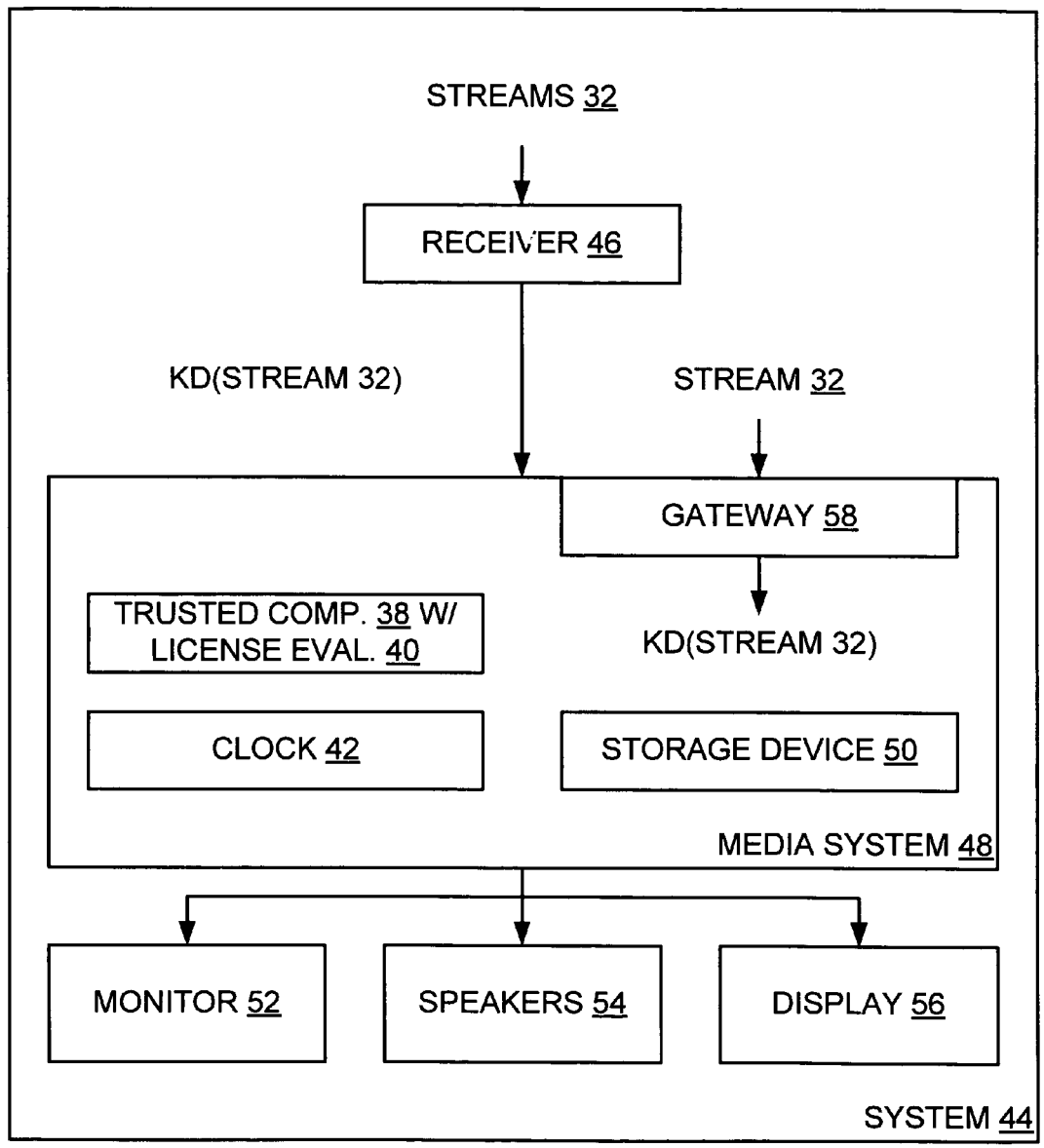
FIG. 4 is a block diagram showing an example of the trust-based system of FIG. 3, and in particular shows a receiver forwarding an encrypted stream of content to a media system for rendering thereby in accordance with various embodiments of the present invention.

Turning now to FIG. 4, a system 44 for receiving and handling multimedia content 32 is shown. As should be evident, such system 44 is particularly suited for handling an input signal comprising multiple streams of multimedia content 32, such as for example a television signal from a multi-channel distributor. However, such will be system 44 may also handle other input signals without departing from the spirit and scope of the present invention.

In the system 44, the aforementioned input signal as provided by the distributor thereof is applied to a receiver 46 which may be any appropriate receiver without departing from the spirit and scope of the present invention, presuming of course such receiver can performs the functions set forth herein. For example, the receiver 46 may be a Uni-Directional Cable Receiver (UDCR) such as is being developed to receive a digital cable television signal and forward same for further digital processing including rendering of content 32 therein.

As may be appreciated, the receiver 46 upon being so commanded tunes one of the multiple streams of multimedia content 32 from the input signal and forwards same for further processing. In addition, the receiver 46 prior to forwarding the tuned stream of content 32 may if necessary convert such stream 32 from a native format to a format more amenable for such further processing.

As envisioned, each of the multiple streams of multimedia content 32 in the input signal may or may not be encrypted. Upon tuning a particular stream of content 32 within the input signal, then, the receiver 46 decrypts such stream if encrypted and re-encrypts same in a manner that will be set forth in more detail below, or merely encrypts the stream if not encrypted, again in a manner that will be set forth in more detail below. As was alluded to above, the receiver 46 encrypts the stream of content 32 as part of ensuring that the stream is RM-protected. Thus, the stream of content 32 is not available to be redistributed in an unprotected form.

As also shown in FIG. 4, a media system 48 is provided to receive the encrypted stream of content 32 from the receiver 46 and further process same. Presumably, the media system 48 commanded the receiver 46 to tune the particular stream of content 32 from within the input signal, perhaps upon receiving a corresponding command from a user, although it maybe appreciated that such a command may be initiated by other sources without departing from the spirit and scope of the present invention. At any rate, upon receiving the stream of content 32 from the receiver 46, the media system 48 stores same in an appropriate storage device 50 for retrieval and rendering, either immediately or upon some time delay. Upon rendering of the stream 32, the media system 48 forwards appropriate signals to one or more output devices such as one or more monitors 52, speakers 54, other displays 56, and the like.

Inasmuch as the stored stream 32 is in the RM-protected form, the media system 48 includes RM components such as the trusted component 38, license evaluator 40, and clock 42 of FIG. 3. Thus, upon retrieving a particular stream 32, the media system 38 renders same, but only in accordance with a corresponding license 36 as will be set forth in more detail below. Accordingly, the encrypted stream 32 is decrypted and rendered only in if such license 36 so allows, and with the content key (CK) set forth in the license 36. Note that inasmuch as the encrypted stream 32 is stored at least temporarily on the (first) media system 48, a user thereof may in theory copy same to another (second) media system 48 for rendering thereby. However, inasmuch as the stream is encrypted and decryptable only according to the license 36, and inasmuch as the license 36 is tied to the first media system 48, such license 36 may not be employed by the second media system 48.

As should be understood, though, it may be the case that the first media system 48 can issue a sub-license 36 for the copied stream 32 to the second media system 48, presuming the first media system 48 is in fact capable of doing so and the license 36 so allows. If so, the sub-license 36 as tied to the second media system 48 can in fact be employed by the second media system 48 to render the stream 32.

Proximity Detection

Figure 5:
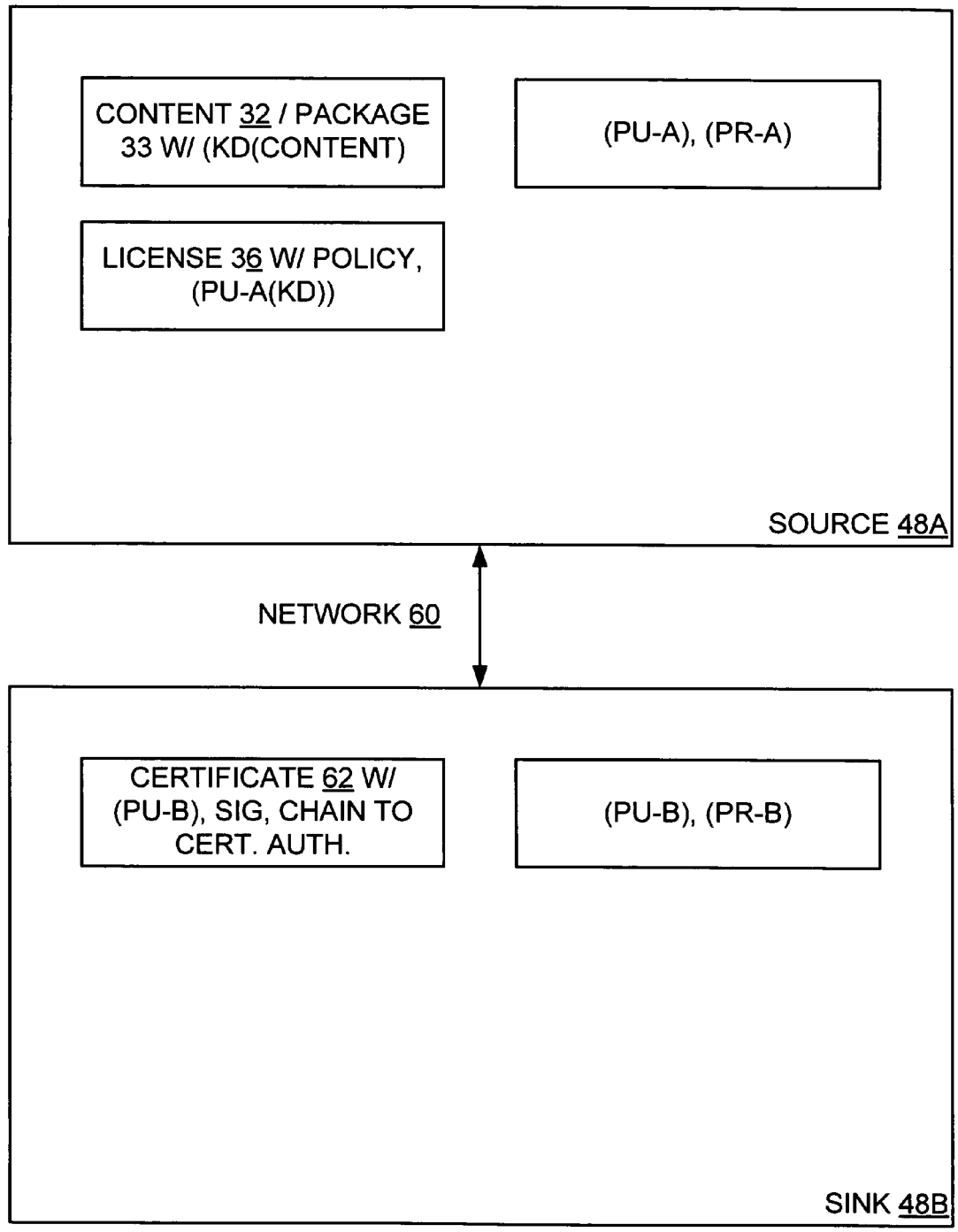
FIG. 5 is a block diagram showing a computing device acting as a sink for rights-managed content networked to a computing device acting as a source for the content in accordance with one embodiment of the present invention.

Turning now to FIG. 5, it is seen that in one embodiment of the present invention, a first media system 48 or the like acting as a source 48a transmits content 32 such as a stream 32 to a second media system 48 acting as a sink 48b over an interconnecting network 60, where the sink 48a already has such content 32 and a license 16 corresponding thereto, and where the source 48a has a public-private key pair (PU-A, PR-A) associated therewith and the sink 48b likewise has a public-private key pair (PU-B, PR-B) associated therewith. As shown, the content 32 is in the form of a content package 33 with the content 32 encrypted according to a symmetric content key (KD) to result in (KD(content)), and the license 16 includes a description of rights and conditions (hereinafter, 'policy'), perhaps including whether the sink 48b may access the content 32 by way of the source 48a and the network 60, and also includes the content key (KD) encrypted according to the public key of the source 48a (PU-A) to result in (PU-A(KD)). Note that although the present invention is disclosed primarily in terms of a symmetric content key (KD) and public-private key pairs for the source 48a and the sink 48b, other encryption arrangements may also be employed without departing from the spirit and scope of such present invention.

In one embodiment of the present invention, the method of delivering the content 32 from the source 48a to the sink 48b is agnostic to the actual protocols used for transporting the content 32. Thus, the particular way in which the source 48a and sink 48b communicate is irrelevant to the method. In addition, in one embodiment of the present invention, the method of delivering the content 32 from the source 48a to the sink 48b is agnostic to the format of the content 32. Thus, the any particular type of content 32 may be sent from the source 48a to the sink 48b by way of such method.

Figure 6:
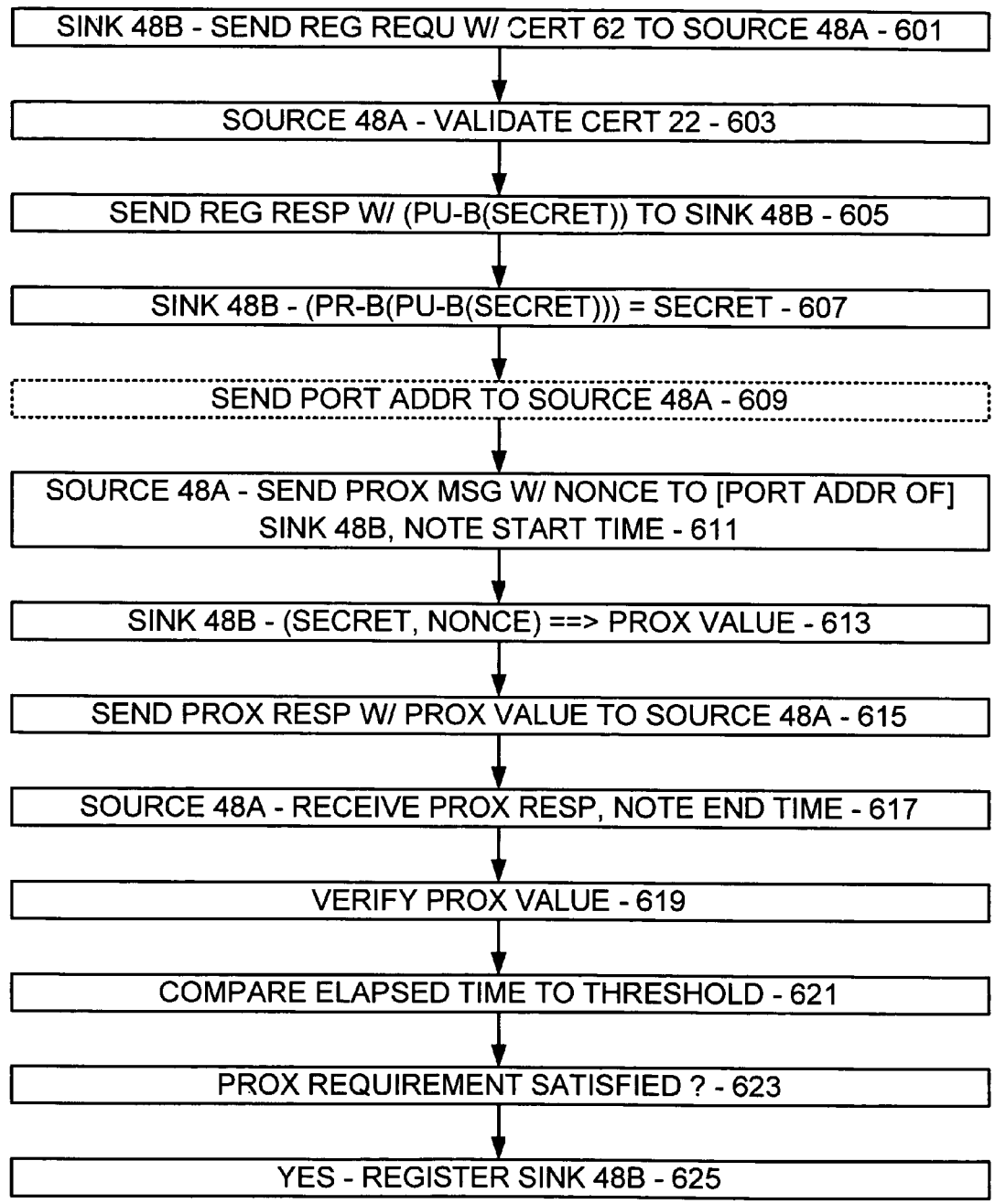
FIG. 6 is a flow diagram showing key steps performed by the source and sink of FIG. 5 in the course of the source registering the sink only if the sink satisfies a proximity requirement in accordance with one embodiment of the present invention.

Turning now to FIG. 6, to arrange for the sink 48b to access the content 32 by way of the source 48a and network 60, and in one embodiment of the present invention, the sink 48b must first securely establish to the source 48a that such sink 48b is physically close to or proximate to such source 48a. As may be appreciated, such proximity as established tends to correlate highly with whether the user of the source 48a is also the user of the sink 48b. Put another way, although not conclusive, a particular source 48a that has been found to be proximate to a particular sink 48b is likely to be joined to such particular sink 48b by some sort of local network 60 or the like, and thus it may be concluded that the source 48a and the sink 48b are under the common control of the user.

From the point of view of the owner of the content 32, then, the content 32 as licensed to the source 48a can be sub-licensed to the sink 48b if it can be shown that the source 48a and the sink 48b are likely under the common control of the user, inasmuch as the point of the sub-license 36 is to allow the same user to render the content 32 on either the source 48a or the sink 48b. Correspondingly, the content 32 as licensed to the source 48a can not be sub-licensed to the sink 48b if it can be shown that the source 48a and the sink 48b are not indeed likely under the common control of the user, inasmuch as the point of the sub-license 36 would likely be to allow different users to render the content 32 on the source 48a and the sink 48b. In the latter case, and as should be understood, the user at the sink 48b must obtain its own license 36, if possible.

A perfect and error-proof solution to determine commonality as between the user of the source 48a and the user of the sink 48b which can operate on currently existing hardware and software systems is currently unknown. However, a mechanism that provides a satisfactory approximation of such commonality lies in determining digital proximity between digital systems, as an indication of physical proximity. As may be appreciated, such a proximity detection test relies on the presumption that media systems 48 that are physically close typically belong to the same user.

In the present invention, then, physical proximity between a source 48a and a sink 48b is securely detected based on proximity detection test that relies on the principle that a correlation exists between digital proximity and communication delays. In addition, in the present invention, such a prox-imity detection test is performed in such a manner that the test represents a relatively low utilization of resources on the part of the source 48a and the sink 48b. Accordingly, such test can be employed even with a relatively simple source 48a and sink 48b.

In particular, and still referring now to FIG. 6, in one embodiment of the present invention, the sink 48b registers with the source 48a as part of establishing a source-sink relationship therewith, and in doing so the sink 48b sends a registration request to the source 48a by way of the interconnecting network 60 (step 601). The registration request may include an identification of the sink 48b, and such identification may at least be partially achieved by including with the registration request a digital certificate 62 provided to the sink 48b either directly or indirectly by an appropriate certifying authority. As may also be appreciated, the digital certificate 62 includes therein the public key of the sink 48b (PU-B) and is digitally signed either directly or indirectly by the certifying authority, and thus the digital signature of the certificate 62 may be verified by the source 48a presuming such source 48a has appropriate knowledge of such certifying authority. For example, the certificate 62 may include a chain of certificates leading back to the certifying authority, whereby the source 48a with knowledge of a verifying public key corresponding to the certifying authority may verify the chain of certificates to ascertain that the certificate 62 did indeed originate from the certifying authority.

At any rate, upon receiving the registration request, the source 48a validates the certificate 62 thereof (step 603), and in particular verifies that the certificate 62 can be traced back by way of the accompanying chain of certificates to a certifying authority known to and approved by such source 48a, and may also verify with reference to an appropriate revocation list 26 thereof that the certificate 62 has not been revoked. Essentially, then, the source 48a will impart trust to the sink 48b to properly handle received content 32, at least in part, if the sink 48b owns a non-revoked certificate 62 derived from an approved certifying authority.

Presuming the source 48a finds a non-revoked and approved certificate 62 in the registration request, and in one embodiment of the present invention, the source 48a then also ensures that the sink 48b is within a certain proximity to the source 48a, measured either as a function of distance, time, or otherwise. In particular, the source 48a and the sink 48b perform the following proximity detection test.

In particular, in response to the request as at step 601, the source 48a sends a registration response to the requesting sink 48b by way of the interconnecting network 60 (step 605). In one embodiment of the present invention, the registration response in pertinent part a secret to be employed as will be set forth in more detail below. As should be appreciated, the secret is essentially a random cryptographic value, and especially if symmetric in nature should thus be encrypted in a manner decryptable by the sink 48b. In particular, to prevent any nefarious entity from browsing such secret, such secret should be encrypted by way of (PU-B) as obtained from the certificate 62 received in connection with the request, although another cryptographic key may be employed without departing from the spirit and scope of the present invention.

Upon receiving the registration response, the sink 48b decrypts the encrypted secret therein by way of application of (PR-B) thereto (step 607). At this point, and optionally, the sink 48b may send an address of a port thereof to the source 48a by way of the interconnecting network 60 (step 609). If in fact sent, the port should be an appropriate port of the sink 48b selected primarily based on how quickly the source 48a can access the sink 48b thereby for the reason that the proximity requirement is satisfied primarily based on how quickly the source 48a sends a proximity message to the sink 48b and receives a proximity response therefrom. Of course, sending such port can be dispensed with, especially if the source 48a should already know same or if the sink 48b does not employ a port architecture.

At any rate, and presuming that the source 48a has received a port address from the sink 48b, the source 48a performs a proximity detection test by sending a proximity message with a nonce to the sink 48b by way of the network 60 and the received port address of such sink 48b (step 611). The nonce is to be employed as will be set forth in more detail below. The nonce is essentially a random value. Concurrently with step 611, the source 48a notes a start time at which the proximity message with the nonce is sent.

The sink 48b receives the proximity message with the nonce from the source 48a by way of the network 60 and the port address of such sink 48b, and thereafter employs the received secret and the received nonce to produce a proximity value (step 613), and then sends a proximity response with the proximity value back to the source 48a by way of the network 60 (step 615). Note that the proximity value may be any value based on the secret and the nonce without departing from the spirit and scope of the present invention. For example, the proximity value may be the nonce encrypted by the secret, or may be a cryptographic hash of the secret and the nonce. Likewise, the proximity value may be achieved by employing the first nonce as a cryptographic key to perform a cryptographic hash over the nonce.

Notably, and as was alluded to above, the computation of the proximity value should require only a relatively low utilization of resources so that the proximity detection test is not excessively taxing, and also so that the computation does not represent an especially large period of time. Thus, the computation has a low computational cost that does not unduly add a delay that could skew the proximity detection test. Also notably, employing the secret in the proximity value shows to the source 48a that the proximity response came from the sink 48b and not some other entity pretending to be the sink 48b. Likewise, employing the nonce in the proximity value shows to the source 48a that the proximity response corresponds to the proximity message. As may be appreciated, the proximity value must be unpredictable without knowledge of the secret and the nonce.

At any rate, the source 48a receives the proximity response with the proximity value from the sink 48b by way of the network 60 (step 617), and concurrently therewith notes an end time at which the proximity value is received, thus ending the proximity test. Thereafter, the source 48a verifies the proximity value based on knowledge of the secret and the nonce (step 619). Presuming the proximity value verifies, the source 48a then calculates from the noted start and end times an elapsed time and compares same to a predetermined threshold value (step 621), and decides from the comparison whether the sink 48b is close enough to satisfy the proximity requirement (step 623). If so, the source 48a registers the sink 48b as being able to access content 32 from such source 48a by way of the interconnecting network 60 (step 625).

If not, the source 48a may deny registration and either terminate communication with the sink 48b or else again perform steps 611-623 as another proximity test based on the same secret. In fact, the proximity detection test may be repeated several times until the proximity requirement is satisfied, especially if the source 48a and/or sink 48b reside in a noisy environment that may adversely affect the result of such proximity test in a manner not relevant to physical distance. Presuming the proximity test and the requirement thereof are satisfied once, the source 48a may agree to register the sink 48b.

As may be appreciated, the elapsed time compared to the predetermined threshold value as at step 621 should at least roughly correspond to how far away the sink 48b is from the source 48a, and thus the elapsed time from the proximity test should be less than the threshold value to satisfy the proximity requirement. Such a threshold value may be determined for the source 48a on a case-by-case basis, may be set to a particular value by some external source, may be set to a particular value by a requirement of a license 16, or the like. Empirically, it has been found that good results have been obtained with a threshold value on the order of 7 milliseconds or so.

Once registered to the source 48a, the sink 48b may remain registered indefinitely. Alternatively, the source 48a may periodically require the sink 48b to re-register in accordance with the method shown in FIG. 6. Among other things, periodically re-registering the sink 48b ensures that the sink 48b still satisfies the proximity requirement. Such re-registration may for example be prudent in the case where the sink 48b is mobile or can be moved with relative ease.

As should now be evident, the proximity detection test of the present invention as set forth in connection with FIG. 6 may be employed in connection with any source 48a connected to any sink 48b over any network 60. For example, the network 60 may be a home local area network employing IP addressing, or may simply comprise the source 48a and the sink 48b connected by a USB bus connection, a PCI bus connection, etc. In summary, the proximity detection test of the present invention may be practiced in connection with any sort of architecture of networked computing devices 34 sharing protected content 32 without departing from the spirit and scope of the present invention.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a system and method are provided for a first media system 48a or the like to ensure that a second media system 48b or the like is proximate to the first media system 48a prior to allowing the second media system 48b to render content 32 licensed to the first media system 48a. Te first media system 48a can at least roughly determine how close the second media system 48b is to the first media system 48a based on an amount of time to respond to a sent message.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for a computing device acting as a sink for rights-managed content to register with a computing device acting as a source for the content, the sink employing a port architecture comprising multiple ports, the source registering the sink only if the sink satisfies a proximity requirement, the method comprising:

the sink sending a registration request to the source;

the source validating the registration request;

the source sending a registration response to the sink, the registration response including a first random value as a secret;

the sink sending to the source, a port address of a first port of the sink, the first port selected for satisfying the proximity requirement based on speed of message communications between the source and the sink via the first port;

the source sending a proximity message to the sink via the first port and concurrently noting a start time, the proximity message including a second random value selected as a nonce for one time use;

the sink upon receiving the proximity message employing the secret and the nonce to generate a proximity value and sending a proximity response with the proximity value to the source; and the source receiving the proximity response with the proximity value from the sink via the first port and concurrently noting an end time, verifying the proximity value based on the secret and the nonce, calculating from the noted start and end times an elapsed time, comparing the elapsed time to a predetermined threshold value, deciding from the comparison whether the sink satisfies the proximity requirement, and registering the sink as being able to access content from such source if the sink satisfies the proximity requirement.

2. The method of claim 1 wherein the sink sending the registration request to the source comprises including a digital certificate provided to the sink by an appropriate certifying authority, the certificate including therein a public key of the sink (PU-B) and a digital signature, the method also comprising the source validating the certificate and verifying with reference to a revocation list that the certificate has not been revoked.

3. The method of claim 1 wherein the sink sending the registration request to the source comprises including a public key of the sink (PU-B), and comprising the source sending the registration response to the sink, the registration response including the secret encrypted according to (PU-B) and the sink decrypting the encrypted secret by application of a private key (PR-R) corresponding to (PU-R).

4. The method of claim 1 comprising the sink generating the proximity value by employing the secret as a cryptographic key to perform an encryption of the nonce and thus result in an encrypted value.

5. The method of claim 1 comprising the sink generating the proximity value by employing the secret as a cryptographic key to perform a hash over the nonce and thus result in a hash value.

6. The method of claim 1 comprising the sink generating the proximity value by performing a hash over the secret and the nonce to result in a hash value.

7. The method of claim 1 comprising the source comparing the elapsed time to a predetermined threshold value, deciding from the comparison that the sink satisfies the proximity requirement if the elapsed time is less than the threshold value, and registering the sink as being able to access content from such source if the sink satisfies the proximity requirement, whereby the sink satisfying the proximity requirement corresponds to the sink being physically close to the source.

8. The method of claim 1 comprising the source comparing the elapsed time to a predetermined threshold value, deciding from the comparison that the sink satisfies the proximity requirement if the elapsed time is greater than the threshold value, and registering the sink as being able to access content from such source if the sink satisfies the proximity requirement, whereby the sink satisfying the proximity requirement corresponds to the sink being physically far from the source.

9. A method for a computing device acting as a sink for rights-managed content to be registered with a computing device acting as a source for the content, the sink operating in a noisy environment and employing a port architecture comprising multiple ports, the source registering the sink only if the sink satisfies a proximity requirement, the method comprising the source, upon receiving a registration request from the sink:

sending a registration response to the sink, the registration response including a first random value as a secret for repeated use thereon in registration-related communications between the sink and the source;

sending a first proximity message to the sink and concurrently noting a first start time, the first proximity message including a first nonce for one time use, the sink upon receiving the first proximity message employing the secret and the first nonce to generate a first proximity value and sending to the source, a first proximity response containing the first proximity value;

receiving the first proximity response from the sink and concurrently noting a first end time, verifying the validity of the first proximity response based on the secret and the first nonce, calculating from the first noted start and end times an elapsed time, comparing the elapsed time to a predetermined threshold value, deciding from the comparison that the sink fails to satisfies the proximity requirement, and in response thereto, sending a second proximity message to the sink and concurrently noting a second start time, the second proximity message including a second nonce for one time use, the second nonce being different than the first nonce, the sink upon receiving the second proximity message employing the secret and the second nonce to generate a second proximity value and sending to the source, a second proximity response containing the second proximity value; and receiving the second proximity response from the sink and concurrently noting a second end time, verifying the validity of the second proximity response based on the secret and the second nonce, calculating from the second noted start and end times an elapsed time, comparing the elapsed time to the predetermined threshold value, deciding from the comparison that the sink satisfies the proximity requirement, and in response thereto, registering the sink as being able to access content from such source.

10. The method of claim 9 wherein the sink sends a port address of a first port thereof to the source, the first port selected for satisfying the proximity requirement based on speed of massage communications between the source and the sink via the first port, the method further comprising the source sending the proximity message to the sink via the first port and concurrently noting the first start time.

11. The method of claim 9 wherein the registration request received by the source includes a digital certificate provided to the sink by an appropriate certifying authority, the certificate including therein a public key of the sink (PU-B) and a digital signature, the method further comprising validating the registration request by the certificate and verifying with reference to a revocation list that the certificate has not been revoked.

12. The method of claim 9 wherein the registration request received by the source includes a public key of the sink (PU-B), registration response comprises the secret encrypted according to the sink (PU-B), and wherein the sink decrypts the encrypted secret by application of a private key (PR-R) corresponding to (PU-R).

* * * * *